UNITED STATES PATENT OFFICE 2,049,480

OXIDATION PRODUCTS OF CYSTINE AND RELATED COMPOUNDS AND PROCESS FOR MAKING THE SAME

Gerrit Toennies, Narberth, Pa.

No Drawing. Application February 25, 1933, Serial No. 658,667

10 Claims. (Cl. 260—112)

The general object of the present invention is the production of series of sulfoxides and sulfones, derived by oxidation of the sulfur-groups of certain sulfides, for instance sulfides of aminoacids or polypeptides, the molecule of which contains a group or groups having basic properties sufficiently strong to allow ionization to take place in nonaqueous and non-alcoholic media by the action of an acid. The compounds to be prepared are intermediary with respect to their level of oxidation, between the starting material and the corresponding sulfonic acids, namely such intermediate compounds as sulfoxides and sulfones. The method is more particularly of value in cases where the compound to be thus partially oxidized is not sufficiently soluble in non-aqueous and non-alcoholic media, but where oxidation in a non-aqueous, non-alcoholic medium is required, either because the starting material is not stable in aqueous or alcoholic solutions or because the above-mentioned intermediate compounds are not stable in, or cannot be isolated conveniently from, aqueous or alcoholic solutions. The method is of value also in that it serves in the production of compounds from which by controlled hydrolysis the intermediate acids known as sulfenic and sulfinic acids may be prepared, especially in cases where these acids are not accessible by other methods.

A more specific object is to provide means for the production of the classes of intermediate sulfur-oxidation products, mentioned above, derived from cystine, glutathione, insulin and related disulfide compounds. The system of intermediate oxidation products involved, of the disulfides just mentioned, for example, may be schematically represented as follows (where R represents the radicles joined to the —S—S— group in cystine or in cystine derivatives, especially such as derive from cystine by amino acids or polypeptides being joined to cystine by polypeptide linkages):—

| Acids | Anhydric Forms | |
|---|---|---|
| | Symmetrical | Asymmetrical |
| R—S H (I) | | |
| | R—S—S—R (II) | |
| R—SO H (III) | | R—S—SO—R (IV) |
| | R—SO—SO—R (V) | R—S—SO$_2$—R (VI) |
| R—SO$_2$H (VII) | | R—SO—SO$_2$—R (VIII) |
| | R—SO$_2$—SO$_2$—R (IX) | |
| R—SO$_3$H (X) | | |

In this scheme, the theoretically possible compounds are arranged, (1) vertically, according to increasing degree of oxidation; (2) horizontally, in such manner that two compounds appearing on the same horizontal line differ only by the presence or absence of one molecule of water, (e. g. III and IV: R—S—SO—R+H$_2$O= 2RSOH), or by simple isomerism, (e. g. V and VI).

In the case of the compounds mentioned (cystine, glutathione, insulin), methods are at present available only for the preparation of the compounds (I), (II) and (X).

In the oxidation of the compounds under consideration in an aqueous solution, it is known that oxidation by agents such as bromine or iodine leads, in the case of cystine, for instance, to the formation of cysteic acid (Shinohara, J. Biol. Chem. 96, 285 [1932], 97, XXII [1932], and literature quoted by this author):

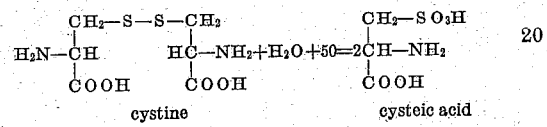

cystine　　　　　　　　　　cysteic acid

This indicates that, by oxidation in aqueous solution, the —S—S— linkage is weakened to such an extent that it undergoes complete hydrolysis. In order to exclude hydrolysis, or the analogous action of alcoholysis, it therefore becomes necessary to carry out oxidation in a non-aqueous and non-alcoholic medium.

Search of the literature did not reveal any method for dissolving cystine in any but aqueous media. While the preparation of a water-free solution of perchloric acid has been described by Hall and Conant (J. Am. Chem. Soc. 49, 3047 [1927]), who used acetic acid as the solvent, no report on the application of acetonitrile as a solvent for strong acids in general has been found.

Although it is known that certain aliphatic monosulfides such as, for instance, di-alkyl and di-aryl monosulfides, their halogen substitution products, etc., which are soluble in chloroform, ether, or similar media, can be oxidized to yield the corresponding sulfoxides and sulfones by the action of perbenzoic acid (benzoyl hydroperoxide) (Lewin, J. Prakt. Chemie 128, 171 [1930] and preceding literature), it does not appear that the lower oxidation products, the sulfenic or sulfinic acids, sulfoxides or sulfones, have been produced heretofore from cystine, insulin, etc., which are insoluble in the non-aqueous media just described.

The general method devised by me for the preparation of the partial oxidation products of cystine, and the other related compounds, consists in dissolving an equivalent amount of the basic sulfide in a freshly prepared acetonitrile solution of concentrated aqueous perchloric acid, or other suitable acid, of sufficient acidic strength, such as trichloromethanesulfonic acid. For acetonitrile may be substituted any other non-aqueous and non-alcoholic solvent having comparable dielectric properties and physical constants, which will permit operation under the condition of the example (such as propionitrile, for instance), and in which a stable solution can be obtained. When such solution has been obtained, there is added a freshly prepared solution of acetic anhydride in the same solvent, that contains the amount of acetic anhydride equivalent to the amount of water introduced with the acid, according to the equation

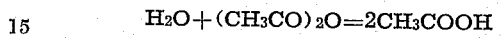

$$H_2O + (CH_3CO)_2O = 2CH_3COOH$$

Any anhydride, reacting similarly with water (such as propionic anhydride, for instance) may be substituted for acetic anhydride. I have found that this reaction approaches completion, in the case of cystine in a solution of perchloric acid in acetonitrile, within twenty-four hours at room temperature. I also have found that in the case of cystine, perchloric acid and acetonitrile, an amount of cystine that is stoichiometrically equivalent to the perchloric acid present goes into solution, and that, in the solution thus obtained, the cystine remains practically unchanged for at least four weeks at room temperature, if the concentration of cystine perchlorate is about one-tenth normal. Similar solutions of a practical degree of stability have also been obtained with concentrations up to one-half normal, and may be obtained even at higher concentrations.

In such a solution, the sulfur compound is oxidized by means of perbenzoic acid (or other peracid of similar oxidizing activity, which will not incidentally form water or any other compound which will tend to decompose or react with the desired compounds).

The illustrative example described below demonstrates how, in the case of cystine, by using an excess of active oxygen, in the form of perbenzoic acid, dissolved in chloroform, an intermediate oxidation product of cystine may be obtained. This product, when the reaction is permitted to proceed far enough, consists mainly of a high sulfur-oxide (sulfone) of cystine in combination with perchloric acid, approximating the composition:

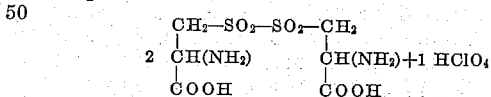

This composition of a perchlorate of a sulfone is indicated by the results of elementary analysis and by the properties of the material. It is a pure white powder of a microcrystalline or amorphous appearance under the microscope, easily decomposed by the humidity of the air; dissolved in water, the acidity of the solution increases rapidly with time, as would be expected if hydrolysis of the —S—S— linkage, with formation of acids, takes place, as shown by the equation:

$$R-SO_2-SO_2-R + H_2O = RSO_2H + RSO_3H$$

The aqueous solution rapidly but not instantaneously, decolorizes iodine, in agreement with the expected oxidation of the acid $RSO_2H$ into $RSO_3H$; where R occurs in this paragraph it indicates the radicle $HOOC-CH(NH_2)-CH_2$.

A preferred method of the process to be applied for the preparation of an intermediate oxidation product of cystine is shown in the example below by way of illustration:

*Example.*—To one-tenth mol of perchloric acid in the form of a 70% aqueous solution, about 500 cc. of acetonitrile are added. To this solution is added immediately more than one-twentieth mol of l-cystine, and the whole is shaken until no more cystine goes in solution. The excess cystine is filtered off and to the filtrate is added a freshly prepared solution of an amount of acetic anhydride equivalent, according to the equation previously given, to the water introduced with the perchloric acid in about 500 cc. acetonitrile. After allowing this solution to stand for about two weeks at room temperature, it is cooled to about $-10°$ C., and to this cooled solution is added the same volume or less of an equally precooled solution of perbenzoic acid in chloroform. The perbenzoic acid solution in chloroform which is thus added should be of such a concentration as to make, in the combined solution, approximately the ratio $$\frac{C_6H_5-COOH}{cystine} = \frac{6}{1}$$

The combined solution is allowed to stand at $-10°$ C. protected from light and humidity, for about 48 hours. Then the white precipitate formed in the solution is filtered off with exclusion of moisture and dried at below 40° C. This precipitate is of the approximate composition indicated in the preceding paragraph.

The foregoing illustration exemplifies one specific embodiment of the invention, and in general sets forth the principles of the process and reactions necessary for carrying it out with respect to other related thio-compounds.

As already indicated, in general, the process will find its appropriate application to other specific materials by the indications and limitations set forth herein with respect to acids, for instance, as substituents for perchloric acid; so also other solvents may be substituted for the aceto-nitrile as, for instance, propionitrile; and thus similarly other appropriate substituents may be employed within the illustration of the disclosure. Obviously, the solvent employed must be chemically inert, to the acid, to the oxidizing agent, and to the reaction products. Thus, for instance, such a compound as formamide would have to be excluded from consideration, because, even though its di-electric constant appears to be suitable enough, its relatively high melting point and its relatively strong basicity render it unadaptable for the purposes set forth and required by the steps of the process as shown in the example.

The limitations thus indicated will, therefore, enable those skilled in the art to resort to other suitable and convenient modifications as may be desired in the practical application of the invention disclosed.

I claim as new:—

1. A stable solution of the normal salt of perchloric acid with the basic amino groups of cystine in a non-aqueous, non-alcoholic solvent having a high dielectric constant, and being inert with respect to the chemical groups present in cystine and its oxidation products.

2. An addition compound of the general formula $2R-SO_2-SO_2-R + HClO_4$, where R equals $HOOC-CH(NH_2)-CH_2-$, occurring in the form of a white powder of microcrystalline or amorphous appearance, characterized in that it is easily decomposed by the humidity of the air and, when dissolved in water, is rapidly hydrolized to its sulfinic and sulfonic acid derivatives.

3. In a process for producing intermediate oxidation products of disulfides of the general formula R—S—S—R, where R represents the radicles joined to the —S—S— group in cystine and its polypeptide derivatives, the step which comprises dissolving such disulfides in a mixture of a concentrated aqueous solution of perchloric acid and a non-aqueous solvent which, by virtue of its high dielectric constant, permits ionization and dissociation of the cystine diperchlorate, and which is non-reactive with any of the chemical groups present in cystine and its oxidation products.

4. In a process for the production of intermediate oxidation products of di-sulfides of the general formula R—S—S—R, where R represents the radicles joined to the —S—S— group in cystine and its polypeptide derivatives, the steps which comprise dissolving such disulfides in a mixture of a concentrated aqueous solution of perchloric acid and a nonaqueous solvent which by virtue of its high dielectric constant permits ionization and dissociation of the cystine diperchlorate and which is non-reactive with any of the chemical groups present in cystine and its oxidation products, and adding a quantity of an aliphatic acid anhydride equivalent to the amount of water introduced in the preceding step.

5. In a process for the production of intermediate oxidation products of di-sulfides of the general formula R—S—S—R, where R represents the radicles joined to the —S—S— group in cystine and its polypeptide derivatives, the steps which comprise dissolving such disulfides in a mixture of a concentrated aqueous solution of perchloric acid and a non-aqueous solvent which, by virtue of its high dielectric constant, permits ionization and dissociation of the formed cystine diperchlorate and which is non-reactive with any of the chemical groups present in cystine and its oxidation products, and adding a quantity of acetic anhydride equivalent to the amount of water introduced in the preceding step.

6. In a process for the production of cystine oxidation compounds, the steps of dissolving cystine in a mixture of an aqueous solution of perchloric acid with a non-aqueous, non-alcoholic medium which, by virtue of its high dielectric constant, permits dissociation and ionization of the formed cystine diperchlorate, and which is non-reactive with any of the chemical groups present in cystine and its oxidation products, adding an aliphatic acid anhydride in an amount equivalent to the water introduced with the aqueous solution of the perchloric acid, allowing the mixture to react, cooling to about −10° C., and then oxidizing slowly at the same reduced temperature.

7. In the process for producing intermediate oxidation products of disulfides of the general formula R—S—S—R, where R represents the radicles joined to the —S—S— group in cystine and its polypeptide derivatives, the steps of dissolving such disulfides in a mixture of a concentrated aqueous solution of perchloric acid and acetonitrile and then oxidizing the disulfide compound formed in such a solution.

8. The process of producing cystine sulfone in the form of a perchlorate, which consists of mixing about 500 cc. of acetonitrile with a solution of one-tenth mol of perchloric acid in the form of a 70% aqueous solution; adding to this mixture 1-cystine in excess of one-twentieth mol; agitating the mixture until no more of the cystine is taken up; filtering off the excess of cystine and adding to the filtrate a freshly prepared acetonitrile solution of a quantity of acetic anhydride theoretically equivalent to the amount of water introduced with the concentrated aqueous perchloric acid solution; allowing this mixture to stand for about two weeks at room temperature, and then cooling to about −10° C.; thereupon adding perbenzoic acid in a ratio six to one of the quantity of the cystine put into the process, in chloroform solution, still maintaining the reduced temperature of −10° C. for about 48 hours under exclusion of light and humidity; and then filtering off the formed precipitate with exclusion of moisture and drying at below 40° C.

9. A stable solution of the normal salt of perchloric acid with the basic amino groups of cystine in acetonitrile.

10. The normal salt of perchloric acid with the basic amino groups of cystine in solution in an alkylonitrile having a high dielectric constant, and being chemically non-reactive to the other ingredients of the solution and to oxygen.

GERRIT TOENNIES.